Dec. 14, 1943.  D. R. ORAM  2,336,883

COMPRESSION-IGNITION FUEL-INJECTION ENGINES

Filed May 29, 1941

Inventor
Daniel R. Oram,

Patented Dec. 14, 1943

2,336,883

UNITED STATES PATENT OFFICE 2,336,883

COMPRESSION-IGNITION FUEL-INJECTION ENGINE

Daniel Robert Oram, Knighton, England

Application May 29, 1941, Serial No. 395,891
In Great Britain May 30, 1940

3 Claims. (Cl. 123—32)

This invention is for improvements in compression-ignition fuel-injection engines, commonly referred to as Diesel engines, and its object is to improve the performance of such engines by providing an improved shape for the combustion space in conjunction with an advantageous location of the injector.

According to this invention a composition-ignition fuel-injection engine is provided with a combustion space comprising two chambers arranged one beyond the other in the axial direction of the cylinder, the lower chamber being centrally located and the upper chamber slightly transversely offset with respect to the lower chamber and communicating therewith by way of a restricted passage or neck between them, and an injector is located in the region of the neck to spray fuel into both chambers. This shape of the combustion space, together with the specified disposition of the injector, makes for a low explosion pressure and for efficient combustion. Furthermore, as the piston crown approaches the cylinder head, the air between the two is caused to flow inwards fom all sides to the lower chamber and therefore to partake of a vortex or "smoke ring" movement in said chamber, which may for this reason be termed a vortex or "smoke ring" chamber. This action may be, and preferably is, materially aided by a complementary coniform shaping of the piston crown and recessing of the cylinder head, to provide a funnel-like space communicating with the vortex chamber. The compression also forces air through the reduced neck or passage into the upper chamber, and owing to the transverse offset of the latter the air partakes of a swirling movement therein, which movements result in adequate oxygen for combustion being brought to each particle of injected fuel. The specified construction of the combustion space and location of the injector permits the advantages both of direct injection into the cylinder (or into what is sometimes referred to as an open combustion chamber) and of indirect injection (into an air cell chamber or ante-chamber) to be obtained. It will be appreciated that the "smoke-ring" effect is rendered more pronounced and dead pockets of air, the contents of which are not brought to the fuel, are to a great extent eliminated in the lower chamber if the latter is substantially spherical. Likewise a substantially spherical construction of the upper chamber promotes swirl and eliminates useless air pockets therein.

Figure 1:
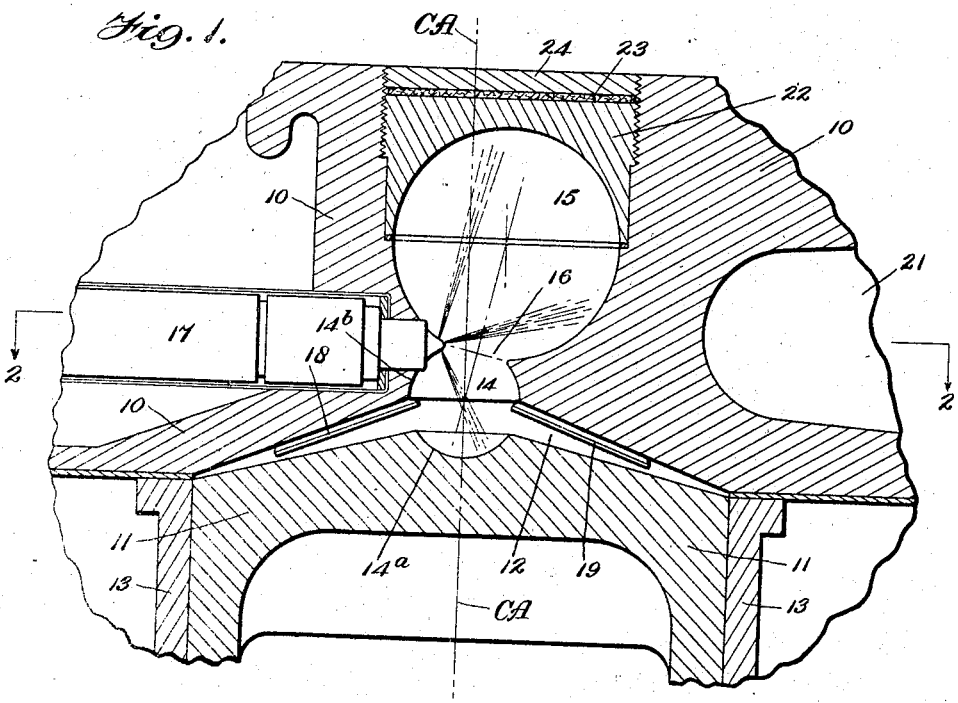
Figure 2:
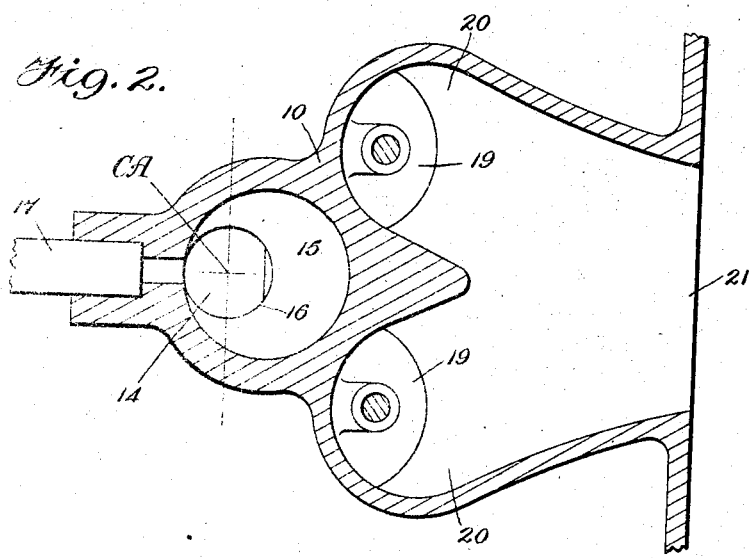

The preferred construction and arrangement of the combustion shape and injector is illustrated in the accompanying drawing, in which Figure 1 is a cross section through the cylinder head, and the upper part of the cylinder and piston with the latter at top dead centre, while Figure 2 is a section on the line 2—2 in Fig. 1.

Both of these figures are partly broken away, omitting details of the water jacket, for the sake of convenience.

As illustrated the cylinder head 10 is interiorly of very shallow conical formation. The piston crown is of like formation, but the cone is even flatter, so that when the piston 11 is at the top dead centre there is an inverted funnel-shaped space 12, Fig. 1, between the crown of the piston and the cylinder head, which space in section tapers outwardly and downwardly towards the cylinder walls 13. This space 12 forms part of the compression or combustion space and its tapering sectional shape is advantageous. Where the apex of the cone of the piston crown would otherwise be presented the piston crown is formed with a shallow part-spherical recess 14a; a complementary part-spherical recess 14b is formed in the cylinder head 10, and these two recesses together define a spherical space 14 which comprise the lower or vortex chamber aforementioned. Above the said lower chamber 14 there is an upper or swirl chamber 15 in the cylinder head 10, said upper chamber being likewise of spherical form but being somewhat offset from the cylinder axis CA so as to communicate with the lower chamber 14 through a neck 16 of reduced diameter.

The air forced into this upper chamber on compression partakes of a swirling motion therein.

The injector nozzle 17 is so accommodated in the cylinder head 10 that injection takes place at the reduced neck 16, the fuel being injected partly into each of the two chambers 14, 15. The injector 17 is located at that side of the cylinder axis CA which is opposite to the side at which the top chamber 15 is offset, and considering the imaginary line which joins the centres of the two chambers and is inclined to the cylinder axis, the upper angle subtended by this line and the axis of the injector is slightly less than a right angle. The injector nozzle may be a single aperture nozzle or a rose nozzle. The preferred type of injector is that illustrated, which throws one spray downwards approximately through the centre of the lower spherical space 14 at an approximate angle of 65° to the horizontal and to the injector axis; another spray up into the top chamber 15 at approximately 17° to the injector axis; and two more sprays into the upper chamber at an angle of approximately 72° to the injector axis and spaced approximately 60° apart (i. e., 30° to each side of the plane in which the injector axis and cylinder axis lie).

A combustion chamber as described may be applied to an engine having any known valve mechanism, either poppet valves or a sleeve valve. In its application to a poppet valve engine it is preferred that the valves shall be of the overhead variety, located in the cylinder head 10. Two inlet valves 18 and two exhaust valves 19 may be provided, the said valves occupying inclined attitudes which are symmetrically located with respect to the cylinder axis. There is a plane of symmetry midway between one exhaust valve and one inlet valve and the other inlet and one exhaust valve. The centre of the top chamber 15 aforesaid lies in this plane of symmetry and the offset is at that side of the cylinder axis CA whereat the exhaust valves 19 are located. The exhaust passages 20, leading from the valve seatings to a common outlet port 21, are taken through the cylinder head 10 in close proximity to the periphery of the upper chamber 15 so that the latter is always maintained at a high temperature by the heat of the exhaust. The inlet passages (not shown) likewise branch from a common inlet port to the inlet valve seatings.

For ease in manufacture and in order to maintain a desirably high temperature in the upper chamber 15, the said upper chamber has its lower half machined in the metal of the cylinder head 10 itself, and its upper half in a plug 22 which is screwed into or otherwise secured in a suitable bore in the top of the cylinder head. This plug 22 is of metal which is adapted to withstand the high temperature to which it is exposed. It is insulated at the top by an asbestos washer 23 and is retained by another plug 24. If desired a heater plug (not shown) may be fitted in plug 22.

The cylinder head is provided with suitable interior spaces for liquid cooling, but alternatively may be ararnged to be air cooled.

I claim:

1. An engine of the compression-ignition fuel-injection type having a cylinder, a piston working therein and a head closing one end thereof, said head being provided with a coniform recess coincident with the cylinder, said head also having a compression space comprising a vortex chamber communicating with the apex of said recess, and a swirl chamber axially adjacent but slightly transversely offset from said vortex chamber and communicating therewith through a restricted passage; said piston having a crown having a conicity less than that of said recess whereby to provide, when the piston is adjacent the head, a funnel-like space between the two communicating with said vortex chamber; and means disposed in the region of said restricted passage for simultaneously injecting fuel into said vortex and swirl chambers at substantial angles to the path of compressed fluid traversing the same.

2. An engine of the compression-ignition fuel-injection type having a cylinder, a piston working therein and a head closing one end thereof, said head being provided with a recess of relatively shallow conical form coincident with the cylinder, said head also having a partly-spherical vortex chamber communicating with the apex of said recess, and a larger substantially spherical swirl chamber axially adjacent but slightly transversely offset from said vortex chamber and communicating therewith through a restricted passage; said piston having a coniform crown of less conicity than said recess whereby to provide when the piston is adjacent the head, a funnel-like space between the two communicating with said vortex chamber, said piston also having a partly-spherical recess at the apex of said crown complementing said vortex chamber; and means for simultaneously injecting fuel into said vortex and swirl chambers from the region of said restricted passage, at substantial angles to the path of compressed fluid traversing the said chambers.

3. A compression-ignition fuel-injection engine, having a cylinder and a compression space communicating therewith, said space comprising two communicating chambers disposed one beyond the other in the axial direction of the cylinder, with a restricted neck between them, the inner of said chambers being formed to produce a vortex- or smoke-ring effect in fluid traversing the same, and the outer of said chambers being slightly offset from the cylinder axis with respect to said inner chamber to produce a swirling effect in fluid in the outer chamber; and a fuel injector located at said neck, at that side of the cylinder axis which is opposite to the side at which said outer chamber is offset.

DANIEL ROBERT ORAM.